Patented Apr. 30, 1935

1,999,610

UNITED STATES PATENT OFFICE 1,999,610

WATER-INSOLUBLE AZO-DYESTUFFS AND FIBER DYED THEREWITH

Erwin Hoffa and Fritz Müller, Frankfort-on-the-Main, Germany, assignors to General Aniline Works, Inc., New York, N. Y., a corporation of Delaware No Drawing. Application October 5, 1931, Serial No. 567,132. In Germany October 10, 1930

8 Claims. (Cl. 260—95)

The present invention relates to new water-insoluble azo-dyestuffs and to fiber dyed therewith.

We have found that the diazonium compounds of amino-substitution products of benzotrifluoride and derivatives thereof, when coupled with 2,3-hydroxynaphthoic acid arylides, neither component containing any solubilizing group, yield dyestuffs of valuable good properties. In general, one can say that, by replacing a hydrogen atom of the benzene nucleus by the trifluoromethyl group, the fastness to light of the resulting dyestuffs is increased. For instance, the dyestuffs obtained from 1-amino-2-chloro-5-trifluoromethylbenzene, in general are faster to light than the corresponding dyestuffs from 1-amino-2-chlorobenzene.

The dyestuffs obtainable by our process possess valuable vivid orange to scarlet tints. The fastness to light of their dyeings when produced on cotton is in general, but especially in the case of the dyestuffs prepared from 1-amino-5-trifluoromethylbenzene, and/or 1-amino-2-chloro-5-trifluoromethylbenzene, a good one. In the case of the before mentioned bases it lies between grades 6 and 7 of the norms for "Lichtechtheit" of the Echtheitskommission der Fachgruppe für Chemie der Farben- und Textilindustrie im Verein Deutscher Chemiker, 4th Edit., 1928 (reprinted in Schultz, Farbstofftabellen, 7th Edit., vol. 1, 1931, page XXXI et seq.).

Furthermore, it is noticeable that our new dyestuffs possess a rather high fastness to boiling with water and to washing. Their fastness in this respect lies in general between grades 4 and 5 of the norms for "Kochechtheit" of the beforesaid Echtheitskommission (Schultz, Farbstofftabellen, vol. 1, 1931, page XXXII).

This latter fact could not be expected in view of the presence of the strongly negative substituent $CF_3$, as it is known that compounds containing the trichloromethyl group are very sensitive to chemical influences.

The dyestuffs can be produced in substance, on the fiber, or in the presence of any of the usual substrata which are adapted for the production of lakes.

The dyestuffs obtained by this invention correspond with the following general formula:

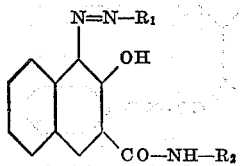

wherein $R_1$ represents a benzene radical which is substituted by the group $CF_3$ and which may further be substituted by alkyl, alkoxy, halogen or the nitro group, $R_2$ represents a radical of the benzene or naphthalene series which must not contain sulfonic or carboxylic acid groups.

The following examples serve to illustrate the invention, but they are not intended to limit it thereto:

(1) 50 grams of cotton yarn are treated with the grounding liquor hereinafter described for half-an-hour, well freed from water by centrifuging or wringing and developed for half-an-hour in the diazo-solution described. The dyed yarn is well rinsed, soaped at boiling temperature and dried.

(a) The grounding liquor is prepared as follows:

| | | |
|---|---|---|
| 5 grams of | | 2'3'-hydroxynaphthoyl- 2 -methoxy-1-aniline are well made into a paste with |
| 10 | cc | of Turkey red oil and |
| 10 | cc | of caustic soda solution, dissolved in boiling water and, after cooling, mixed with |
| 5 | cc | of formaldehyde of 30 per cent. strength and the whole is made up to |
| 1 | liter. | |

(b) The developing bath is prepared as follows:

| | | |
|---|---|---|
| 1.92 grams of | | 1 -amino-2-methoxy-5-trifluoromethylbenzene are diazotized in the cold with |
| 3.1 | cc | of hydrochloric acid of 20° Bé. and |
| 0.75 grams of | | sodium nitrite. The diazo-solution is neutralized with about |
| 2 | grams of | sodium acetate and after addition of |
| 25 | grams of | dissolved sodium chloride, the whole is made up to |
| 1 | liter. | |

The dyeing is a scarlet of good fastness properties. The dyestuff obtained has the following formula:

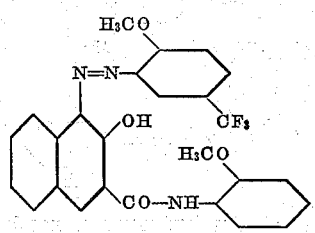

(2) Into a diazo-solution, prepared in the usual manner from 19.6 parts of 1-amino-2-chloro-5-trifluoromethylbenzene, there is slowly run, while well stirring, a solution of 29.5 parts of 2'3'-hydroxynaphthoyl-2-methoxy-1-aminobenzene in a caustic soda solution to which there has been added the quantity of sodium acetate necessary for binding the excess of mineral acid. When the formation of the dyestuff is finished, the latter is separated by filtration and well washed. The dyestuff is advantageously used in the form of a paste. In admixture with one of the usual substrata, it yields an orange-red lake of good fastness properties.

The dyestuff obtained has the following constitution:

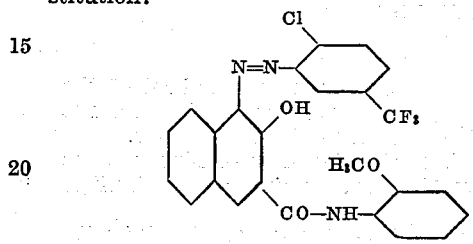

The following dyestuffs, among others, are capable of production in accordance with this invention:

| | Active coupling component | Passive coupling component | Shade |
|---|---|---|---|
| 1 | 1-amino-3-trifluoromethylbenzene | 2',3'-hydroxynaphthoyl-1-amino-2-methoxy-4-chlorobenzene | Orange. |
| 2 | 1-amino-3-trifluoro-methylbenzene | 2',3'-hydroxynaphthoyl-1-amino-2-methoxybenzene | Do. |
| 3 | 1-amino-3-trifluoro-methylbenzene | 2',3'-hydroxynaphthoyl-1-amino-2-methoxy-5-chlorobenzene | Reddish orange. |
| 4 | 1-amino-3-trifluoro-methylbenzene | 2',3'-hydroxynaphthoyl-1-amino-2-methyl-4-methoxybenzene | Brownish orange. |
| 5 | 1-amino-3-trifluoro-methylbenzene | 2',3'-hydroxynaphthoyl-1-amino-2.5-dimethoxy-4-chlorobenzene | Do. |
| 6 | 1-amino-3-trifluoro-methylbenzene | 2',3'-hydroxynaphthoyl-1-amino-4-methoxybenzene | Yellowish scarlet. |
| 7 | 1-amino-2-methoxy-5-trifluoromethyl-benzene | 2',3'-hydroxynaphthoyl-1-amino-2.5-dimethoxy-4-chlorobenzene | Scarlet. |
| 8 | 1-amino-2-chloro-5-trifluoromethyl-benzene | 2',3'-hydroxynaphthoyl-1-amino-2-methoxybenzene | Reddish orange. |
| 9 | 1-amino-2-chloro-5-trifluoromethylbenzene | 2',3'-hydroxynaphthoyl-1-amino-4-methoxybenzene | Orange. |
| 10 | 1-amino-2-chloro-5-trifluoromethylbenzene | 2',3'-hydroxynaphthoyl-1-amino-2-methoxy-4-chlorobenzene | Scarlet. |
| 11 | 1-amino-2-chloro-5-trifluoromethylbenzene | 2',3'-hydroxynaphthoyl-1-aminobenzene | Reddish orange. |
| 12 | 1-amino-2-chloro-5-trifluoromethylbenzene | 2',3'-hydroxynaphthoyl-1-amino-2-methylbenzene | Yellowish scarlet to red-orange. |
| 13 | 1-amino-2-chloro-5-trifluoromethylbenzene | 2',3'-hydroxynaphthoyl-1-amino-2-methoxy-5-chlorobenzene | Do. |
| 14 | 1-amino-2-chloro-5-trifluoromethylbenzene | 2',3'-hydroxynaphthoyl-1-amino-2-ethoxybenzene | Orange. |
| 15 | 1-amino-2-chloro-5-trifluoromethylbenzene | 2',3'-hydroxynaphthoyl-1-amino-2-methyl-4-chlorobenzene | Yellowish scarlet to red-orange. |
| 16 | 1-amino-2-chloro-5-trifluoromethylbenzene | 2',3'-hydroxynaphthoyl-1-aminonaphthalene | Brownish yellow-red. |
| 17 | 1-amino-2-chloro-5-trifluoromethylbenzene | 2',3'-hydroxynaphthoyl-2-aminonaphthalene | Reddish-orange. |
| 18 | 1-amino-2-nitro-4-trifluoromethylbenzene | 2',3'-hydroxynaphthoyl-1-aminobenzene | Orange. |

We claim:

1. The water-insoluble azo-dyestuffs of the following general formula:

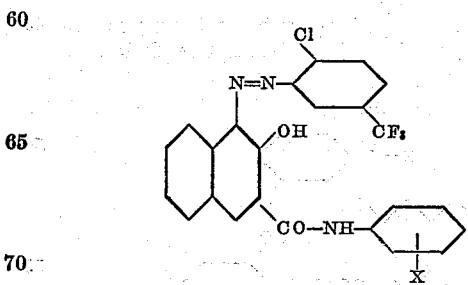

wherein X stands for hydrogen or methoxy, dyeing vivid orange shades and being distinguished by their good fastness properties, particularly by their good fastness to light.

2. The water insoluble azo-dyestuff of the following formula:

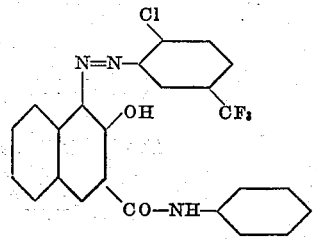

dyeing a reddish-orange shade and being distinguished by its good fastness properties, particularly by its good fastness to light.

3. The water insoluble azo-dyestuff of the following formula:

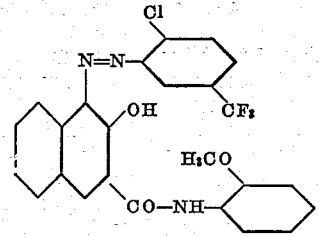

dyeing a reddish-orange shade and being distinguished by its good fastness properties, particularly by its good fastness to light.

4. The water-insoluble azo-dyestuff of the following formula:

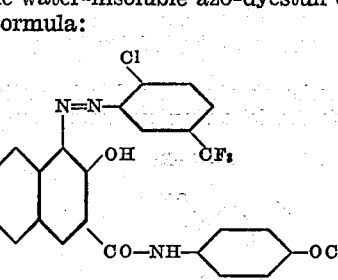

dyeing an orange shade and being distinguished by its good fastness properties, particularly by its good fastness to light.

5. Fiber dyed with the azo-dyestuffs as claimed in claim 1.

6. Fiber dyed with the azo-dyestuff as claimed in claim 2.

7. Fiber dyed with the azo-dyestuff as claimed in claim 3.

8. Fiber dyed with the azo-dyestuff as claimed in claim 4.

ERWIN HOFFA.
FRITZ MÜLLER.